Nov. 9, 1965     D. RUBINSTEIN ETAL     3,217,051

SEPARATION OF THE PARA AND META ISOMERS OF DIVINYLBENZENE

Filed Nov. 23, 1962

DAVID RUBINSTEIN
JOSEPH R. SNYDER
        INVENTORS

BY *William D. Harris, Jr.*

*ATTORNEY*

United States Patent Office 3,217,051
Patented Nov. 9, 1965

3,217,051
SEPARATION OF THE PARA AND META ISOMERS
OF DIVINYLBENZENE
David Rubinstein, Brookline, Mass., and Joseph R. Snyder, Big Spring, Tex., assignors to Cosden Oil & Chemical Company, Big Spring, Tex., a corporation of Delaware
Filed Nov. 23, 1962, Ser. No. 239,647
23 Claims. (Cl. 260—669)

This invention relates to the separation of the para and meta isomers of divinylbenzene, and is more particularly directed to the separation and purification of paradivinylbenzene from its mixture with metadivinylbenzene and various impurities.

Divinylbenzene finds utility as a cross-linking agent in the polymerization of styrene and copolymers of styrene. Moreover, it can be copolymerized with various other monomers, such as chlorostyrene, butadiene, isoprene, cyclopentadiene, methyl methacrylate, vinyl acetate and other vinyl derivatives to yield polymers with properties differing from the homopolymers of these compounds.

Divinylbenzene is normally produced by the dehydrogenation of a mixture of the isomers of diethylbenzene. The reaction product contains principally a mixture of paradivinylbenzene, metadivinylbenzene, the isomers of ethylvinylbenzene, unreacted diethylbenzene, naphthalene, and some impurities. Orthodivinylbenzene is not present since it reacts under dehydrogenation to form naththalene. Unfortunately, fractionation of this mixture does not function to separate the divinylbenzene from the other components since partial or complete gelling of the mixture occurs during distillation. Hence, the only commercially available divinylbenzene is the impure mixture with ethylvinylbenzene and diethylbenzene previously described.

For reproducibility in various applications it is extremely desirable that a divinylbenzene of a uniform composition be utilized. By obtaining a relatively pure paradivinylbenzene, or for that matter, a relatively pure metadivinylbenzene, such uniformity of composition, within practical limits, can be assured. Then too, it will, of course, be appreciated that the symmetrical vs. non-symmetrical structure of the para vs. meta isomers result in two basically different compounds, expected to have varying characteristics in many reactions.

Accordingly, it is an object of this invention to provide a means of preparing substantially pure divinylbenzene, and more specifically, to prepare the para isomer of divinylbenzene. It is an additional object of this invention to provide a means for separating the para and meta isomers of divinylbenzene into substantially pure paradivinylbenzene and a meta rich fraction.

Figure 1:
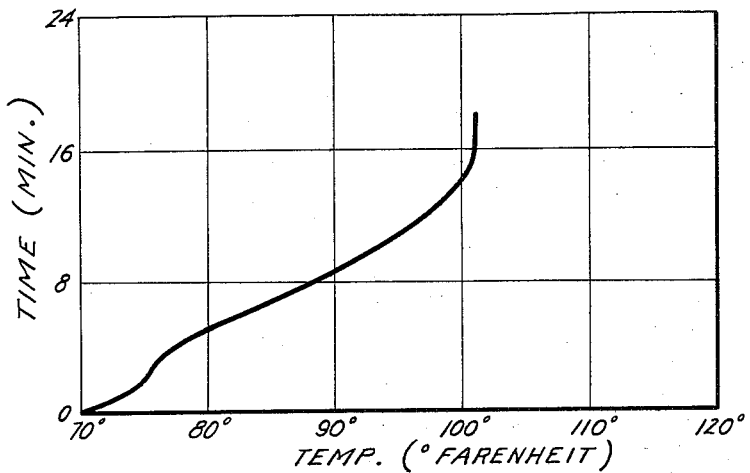
Figure 2:
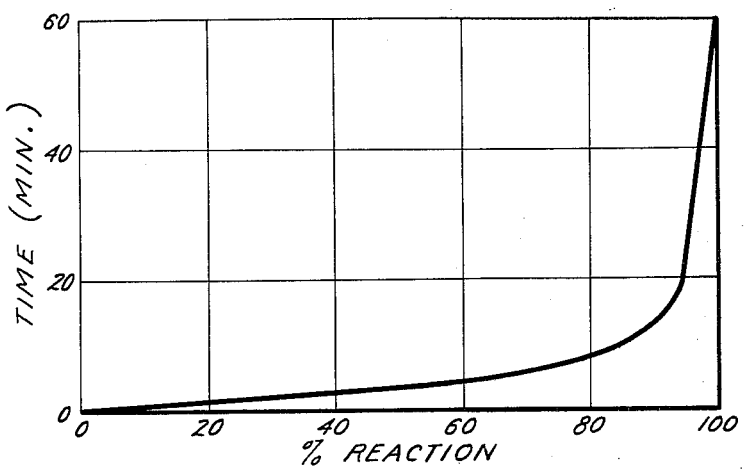

In the drawings:
FIGURE 1 is a time vs. temperature curve for the reaction of commercial divinylbenzene with cuprous chloride;
FIGURE 2 is a percent reaction vs. time curve for the reaction of commercial divinylbenzene with cuprous chloride.

We have found that paradivinylbenzene may be separated from a mixture comprising meta and paradivinylbenzene by contacting the mixture, in liquid state, with a solid monovalent salt of copper or silver to form a solid coordination compound preferentially with the para isomer; separating the coordination compound so obtained from the liquid phase; and heating the coordination compound to recover a relatively high purity paradivinylbenzene.

In brief, a liquid mixture of paradivinylbenzene and metadivinylbenzene (containing such typical impurities as ethylvinylbenzene and diethylbenzene) is brought into contact with the solid monovalent salt of copper or silver, for example, cuprous chloride or silver chloride, and allowed to remain for a time. The monovalent salt forms a coordination compound, preferentially with the para isomer. The coordination compound, or adduct, is separated from the liquid phase by simple filtration and is decomposed by heating to about 75° C., or somewhat higher. The solid monovalent salt is removed by filtration and the resulting liquid is found to contain a substantially increased concentration of paradivinylbenzene.

When the liquid mixture of divinylbenzene isomers is introduced into contact with the solid monovalent salt of silver or copper, a thick, viscous slurry is formed. In those instances where the liquid to solid ratio is quite low, it is beneficial to add an inert liquid, such as benzene or toluene, to increase the liquid to solid ratio and permit proper contact for reaction.

Preferably the solid coordination compound which is removed by filtration is placed in a container to which an appreciable quantity of inert liquid has been added. During the decomposition step, which is accomplished by raising the temperature of the solid coordination compound and the inert liquid to about 75° C., or somewhat higher, the presence of this inert liquid assures that an even means of heat transfer is available to cause decomposition of the adduct.

After the coordination compound is decomposed by heating, the resulting slurry is filtered to separate the metallic salt from the desired product. After filtration the salt is preferably washed with an inert liquid as benzene or toluene to recover the traces of adhering product.

The resultant divinylbenzene filtrate, plus the wash liquid, is then heated to distill off the benzene or toluene under high vacuum. The resulting liquid residue is found to be relatively pure paradivinylbenzene.

It is noted that the above separation process can be effectively conducted when diethylbenzene, ethylvinylbenzene, and various other impurities are present along with the mixed divinylbenzene isomers from which the para isomer is to be separated.

In some instances, it is desirable to add a lower primary alcohol to the liquid mixture prior to contacting it wilth the solid monovalent salt of silver or copper. The alcohol, specifically methyl, ethyl, or propyl alcohol, apparently catalyzes the formation of the adduct. However, as will be seen hereinafter, the process may be run without such alcohol.

The following examples specifically illustrate the practice of this invention.

EXAMPLE 1

To a beaker containing 300 grams of commercial divinylbenzene at 21° C., composed of 2.3 weight percent diethylbenzene, 41.3 weight percent ethylvinylbenzene, 17.7 weight percent paradivinylbenzene, 37 weight percent metadivinylbenzene and 1.7 weight percent of various impurities, was added 150 grams of anhydrous cuprous chloride at 21° C. while constantly stirring. Stirring was continued for a period of thirty minutes. At the end of the first fifteen minutes, the temperature had risen to 38° C. and then it dropped back to about 35°C. in the next fifteen minutes.

It was observed that the cuprous chloride formed a solid adduction compound with part of the commercial divinylbenzene. After the lapse of the thirty-minute reaction time, this adduct was separated by filtering through a Buchner funnel to remove the unreacted hydrocarbon. The adduct so recovered was washed with toluene to remove impurities. Thereafter, the adduct was heated in a beaker in the presence of 150 milliliters of toluene at 80° C., while agitating the resultant slurry. After the temperature of 80° C. was reached, the slurry was filtered and the recovered solid, which was cuprous chloride, was washed with 50 milliliters of toluene. The filtrate plus the toluene wash were subjected to vacuum distillation, at a pressure of about 1 mm. absolute and a temperature of about 50° C. to remove toluene. The resulting liquid was found to contain 85.4 weight percent paradivinylbenzene, 9.1 weight percent metadivinylbenzene and 5.5 weight percent ethylvinylbenzene. It will be appreciated that this process upgraded an initial mixture which contained less than one-half the quantity of paradivinylbenzene than it did metadivinylbenzene to a product that contained almost ten times as much paradivinylbenzene as metadivinylbenzene. The concentration factor achieved in this case was thus about twenty fold.

EXAMPLE 2

To a beaker containing 300 grams of commercial divinylbenzene at 21° C., of the same analysis used in Example 1 above, was added 81 grams of anhydrous cuprous chloride at 21° C. while constantly stirring. Stirring was continued for one hour. As in Example 1, the adduct was filtered, washed with toluene, and heated in the presence of toluene to 80° C. while agitating the resultant slurry. The slurry was then filtered and the filterate collected. The recovered solid was washed with toluene, which wash was combined with the filtrate. After vacuum distilling the toluene from the filtrate-wash combination, the resulting mixture was found to contain 87.7 weight percent paradivinylbenzene, 7.8 weight percent metadivinylbenzene and 4.5 weight percent ethylvinylbenzene. It will be noted that the ratio between para and metadivinylbenzene was so affected by this process as to increase the para to meta factor by twenty-two fold.

From the foregoing two examples, it will be noted that there was little difference in the ultimate result although the reaction was allowed to take place for an hour in Example 2, just twice as long as the thirty minutes allowed in Example 1. In order to determine the importance of the time factor, a time versus temperature curve was run. This is presented in FIGURE 1. It will be noted that when cuprous chloride is added to divinylbenzene, there is a small initial jump in temperature which levels out at between two and three minutes. The main reaction then takes place and the temperature follows a steady rise until it levels out in about fifteen minutes.

Referring to FIGURE 2, a percent reaction versus time curve was determined for the reaction between cuprous chloride and commercial dinvinylbenzene, having the analysis given in Example 1 above, the system being at an initial temperature of 25° C. Comparing FIGURES 1 and 2, it is observed that approximately 92 percent of the reaction has taken place after fifteen minutes, the time at which the system reaches maximum temperature and levels out. It would thus be expected that for reaction times in excess of fifteen minutes, essentially the same results would be obtained. The preceding two examples, and the following examples herein bear this out.

EXAMPLE 3

To a beaker containing a mixture of 300 grams of commercial divinylbenzene, having the same analysis as in Example 1, and 100 milliliters of toluene as an inert diluent, at 7° C., were added 150 grams of cuprous chloride at 7° C. Stirring was maintained during the reaction time of one hour, and the temperature of the reactants was controlled to maintain the system at 7° C. The adduct was collected by filtration and processed as in Example 1. On distilling off the toluene from the filtrate and wash combination, the resulting mixture was found to contain 58.4 weight percent paradivinylbenzene, 30.6 weight percent metadivinylbenzene, and 11 weight percent ethylvinylbenzene. It will be observed that in this case the concentration of paradivinylbenzene to metadivinylbenezene increased only about four fold.

EXAMPLE 4

To a beaker containing 150 grams of commercial divinylbenzene, having the same analysis as in Example 1, at 0° C., were added 150 grams of anhydrous cuprous chloride at 0° C. while constantly stirring. One hour's reaction time was allowed, during which period the system was maintained at 0° C. The adduct was collected and processed as in the prior examples, and the resulting product contained 39 weight percent paradivinylbenzene, 51.1 weight percent metadivinylbenzene and 9.9 weight percent ethylvinylbenzene. In this example, at the lowered temperature of 0° C., it will be noted that the upgrading of concentration of paradivinylbenzene is less than in any of the preceding examples, the improvement in concentration of the para relative to the meta, being approximately one and one-half fold.

On inspection of the foregoing four examples, it can be seen that the ratio of the quantity of commercial divinylbenzene to anhydrous cuprous chloride is not of great importance in causing variation in the relative quantities of para and meta-divinylbenzene in the product, at least in the ranges involved in the examples. This is specifically indicated in a comparison of Examples 1 and 2, wherein a relatively large variation in ratio of commercial divinylbenzene to anhydrous cuprous chloride had little effect on the result. The difference in reaction time, at least in those instances where reaction time is in excess of fifteen minutes, which is true of all examples herein, has been previously shown to have litle effect on the results. The significant variable is therefore seen to be temperature. Thus, in Examples 1 and 2, at a temperature of 21° C., there was over 85 percent paradivinylbenzene present in the adduct. This represented an increase in the relative quantities of para to metadivinylbenzene of about twenty fold.

When the temperature was lowered to 7° C., Example 3, the percent paradivinylbenzene in the adduct was seen to drop to 58.4 percent. The relative increase of para to meta was about four fold in Example 3.

Finally, in Example 4, when the divinylbenzene had an initial temperature of 0° C., the product had only 39 percent para. Here the upgrading in terms of relative para to meta content is still smaller, representing a para to meta ratio improvement of only about one and one-half.

EXAMPLE 5

A series of experiments were conducted in the manner of Example 1, using commercial divinylbenzene having the same analysis as in Example 1 as the starting material; however, the relative quantities and conditions were as follows: The initial temperature of the commercial divinylbenzene and cuprous chloride is shown in Column 1, Table 1, below; the ratio of anhydrous cuprous chloride to commercial divinylbenzene was in accordance with the value indicated in Column 2, Table 1; the reaction time was as in Column 3, Table 1; and methyl alcohol was added in quantity shown in Column 4, Table 1 to the commercial divinylbenzene prior to its contact with the cuprous chloride. In addition to weight percent of para and metadivinylbenzene given in Columns 5 and 6 respectively, Table 1, the following quantities were also determined for each experiment: percent recovery from the adduct of total divinylbenzene available in the commercial divinylbenzene, shown in Column 7; percent recovery from from the adduct of total paradivinylbenzene available in the commercial divinylbenzene, shown in Column 8.

Table 1

| Run No. | Col 1 Temp. (° C.) | Col 2 Ratio CuCl/DVB | Col 3 Reaction time (hours) | Col 4 Methyl alcohol (percent by Wt.) | Col 5 Wt. percent para divinyl benzene | Col 6 Wt. percent meta divinyl benzene | Col 7 Percent DVB recovered | Col 8 Percent P-DVB recovered |
|---|---|---|---|---|---|---|---|---|
| 1 | 25 | 2:1 | 1 | 0 | 84.1 | 11.1 | 28.7 | 80.2 |
| 2 | 25 | 1:1 | 1 | 0 | 88.9 | 6.8 | 30.5 | 65.5 |
| 3 | 25 | 5:1 | 1 | 0 | 83.7 | 9.6 | 34.4 | 79.7 |
| 4 | 25 | 5:1 | 1 | 2 | 84.6 | 10.5 | 35.6 | 91.0 |
| 5 | 25 | 2:1 | 1 | 2 | 87.5 | 9.2 | 30.9 | 71.2 |
| 6 | 25 | 5:1 | 2 | 2 | 81.4 | 13.7 | 34.9 | 92.7 |
| 7 | 25 | 5:1 | 2 | 2 | 84.6 | 10.7 | 34.2 | 89.8 |
| 8 | 25 | 1:1 | 2 | 2 | 86.1 | 9.5 | 33.6 | 89.8 |
| 9 | 25 | 1:1 | 1 | 2 | 75.6 | 16.3 | 34.4 | 86.4 |
| 10 | 25 | 1:1 | 1 | 2 | 82.5 | 11.9 | 33.8 | 86.4 |
| 11 | 25 | 5:1 | 1 | 2 | 87.1 | 9.0 | 32.5 | 84.7 |
| 12 | 25 | 5:1 | 1 | 2 | 84.6 | 9.6 | 35.3 | 89.3 |
| 13 | 10 | 5:1 | 1 | 2 | 72.6 | 18.7 | 35.5 | 88.1 |
| 14 | 4 | 4:1 | 2 | 2 | 45.1 | 43.5 | 60.7 | 89.8 |
| 15 | 0 | 1:1 | 2 | 2 | 44.7 | 48.4 | 71.7 | 89.8 |
| 16 | 0 | 2:1 | 2 | 2 | 37.8 | 56.3 | 78.4 | 89.8 |
| 17 | 0 | 2:1 | 2 | 2 | 42.6 | 50.8 | 70.0 | 92.1 |
| 18 | −50 | 1:1 | 1 | 2 | 34.4 | 41.5 | 71.7 | 93.2 |

It will be observed from Table 1 that temperature, Column 1, is rather critical. With temperatures of 25° C., percent paradivinylbenzene in the product obtained from the adduct ran from about 80 to almost 90 percent. At −50° C., the percent paradivinylbenzene in the product dropped to 34.4 percent. It is apparent that at low temperatures the ratio of para to meta is not appreciably upgraded by the adduction process. On the other hand, it is observed that total recovery of divinylbenzene, see Column 7, is increased with decrease in temperature.

The methyl alcohol appeared to have some catalytic action, increasing the reate of reaction somewhat, but its use is shown to be optional for the various reaction times allowed for the runs of Table 1.

EXAMPLE 6

To a beaker containing 300 grams of commercial divinylbenzene at 70° F., having the same analysis as in Example 1, was added 150 grams of anhydrous cuprous chloride at 70° F., while constantly stirring. Following the procedure of Example 1, the adduct was separated, decomposed, and the recovered enriched paradivinylbenzene fraction was analyzed to contain 84.6% by weight paradivinylbenzene and 9.6% by weight metadivinylbenzene. 1.5% by weight metaethylvinylbenzene and 4.2% by weight paraethylvinylbenzene was also found to be present.

The mother liquor separated from the adduct was collected and analyzed. It was found to contain 32.6% by weight metadivinylbenzene and 1.9% by weight paradivinylbenzene. 32.8% by weight metaethylvinylbenzene and 15.5% by weight paraethylvinylbenzene was also found to be present. It is thus observed that the mother liquor has a meta to para divinylbenzene ratio much greater than is found in the commercial divinylbenzene, before processing in accordance herewith.

EXAMPLE 7

By the procedure of Example 6, commercial divinylbenzene of the analysis of Example 1 was adducted with cuprous chloride and the adduct separated from the mother liquor. The mother liquor was collected and analyzed to contain the following (weight percent):

| | Percent |
|---|---|
| Metadiethylbenzene | 1.5 |
| Paradiethylbenzene | 1.4 |
| Orthodiethylbenzene | 0.5 |
| Metaethylvinylbenzene | 30.6 |
| Paraethylvinylbenzene | 16.2 |
| Metadivinylbenzene | 41.8 |
| Paradivinylbenzene | 2.3 |
| Unknown | 5.7 |

This charge was subjected to the adductive process, with cuprous chloride, as in Example 6. It will be appreciated that this effectively constitutes a second adduction, i.e., an adduction of the mother liquor of the first adduct.

The adduct was separated from the liquid phase, was decomposed and the liquid phase recovered and was analyzed to determine its content. It was found to contain the following (weight percent):

| | Percent |
|---|---|
| Metadiethylbenzene | 0.5 |
| Paradiethylbenzene | 0.5 |
| Orthodiethylbenzene | 0.3 |
| Metaethylvinylbenzene | 14.1 |
| Paraethylvinylbenzene | 8.9 |
| Metadivinylbenzene | 62.5 |
| Paradivinylbenzene | 12.2 |
| Unknown | 1.0 |

It is seen that the liquid material recovered from the adduct, compared to the original commercial divinylbenzene, was a substantially meta enriched product, one having a meta to para ratio of about 5 to 1 (compared to about 2 to 1 in the original commercial divinylbenzene) and further one having a total of approximately 75% divinylbenzene isomers, compared to about 55% in the commercial mixture.

EXAMPLE 8

By mixing commercial divinylbenzene, having the analysis of Example 1, and substantially pure diethylbenzene a mixture was prepared having the following analysis (weight percent):

| | Percent |
|---|---|
| Metadiethylbenzene | 43.5 |
| Paradiethylbenzene | 17.1 |
| Orthodiethylbenzene | 10.7 |
| Metaethylvinylbenzene | 7.1 |
| Paraethylvinylbenzene | 3.7 |
| Metadivinylbenzene | 10.4 |
| Paradivinylbenzene | 5.1 |
| Impurities | 2.4 |

Forty grams of the above mixture, at 25° C., were added to 20 grams of cuprous chloride in a beaker at 25° C., and the resulting mixture in the beaker was agitated for 30 minutes. As confirmed both by analysis and temperature observation, reaction took place so slowly as to be impractical for most commercial operations.

EXAMPLE 9

Forty grams of a mixture of commercial divinylbenzene and diethylbenzene, having the analysis of Example 8 above, were added to 20 grams of cuprous chloride, the initial temperature of the system being 23° C., and in addition, 0.8 gram of methyl alcohol were introduced into the beaker. As in Example 8, the contents of the beaker were agitated for 30 minutes. At the end of 30 minutes the temperature was observed to have risen to 31° C. and on separating the solid phase, decomposing it, and recovering the liquid released thereby, a product was obtained having the following analysis (weight percent):

| | Percent |
|---|---|
| Metaethylvinylbenzene | 0.9 |
| Paraethylvinylbenzene | 2.7 |
| Metadivinylbenzene | 9.1 |
| Paradivinylbenzene | 87.3 |

Hence, comparing this example with Example 8, it is seen that the methyl alcohol added served to catalyze the reaction. Ethyl alcohol or propyl alcohol may effectively be used in place of methyl alcohol, if desired.

From study of the preceding examples, it will be appreciated that a process has been devised for separating paradivinylbenzene from its mixture with meta, along with various other impurities, including diethylbenzene and ethylvinylbenzene.

Not only may a substantially purified paradivinylbenzene be prepared by the foregoing process, but, by separating the mother liquor and by successive adduction a substantially purified metadivinylbenzene may be prepared.

The copper salt used in the adduction process employed in this invention may be any solid monovalent copper salt, for example, in addition to cuprous chloride, cuprous nitrate, cuprous sulfate, cuprous phosphate, cuprous formate, etc. The corresponding silver salts may also be used.

It has been seen that if it is desired (as in those cases where the raw material is weak in divinylbenzene) to use a catalyst, methyl alcohol may be used, or instead, ethyl or propyl alcohol may be substituted therefor.

Various modifications will occur to those skilled in the art and accordingly, it is intended that the description herein given be regarded as illustrative and not limiting except as defined in the claims appending hereto.

We claim:

1. A method of separating paradivinylbenzene from a mixture comprising para and meta divinylbenzene comprising the steps of
   (A) contacting the mixture, in liquid state, with a solid monovalent salt selected from the group consisting of copper and silver to form a coordination compound,
   (B) separating said coordination compound so obtained from the liquid phase,
   (C) heating said coordination compound to recover a liquid having a paradivinylbenzene to metadivinylbenezene ratio substantially greater than in said original mixture.

2. The method of claim 1 wherein an alcohol selected from the group consisting of methyl alcohol, ethyl alcohol and propyl alcohol is added to the mixture and the solid monovalent salt of step (A) to catalyze the reaction.

3. A method of separating paradivinylbenzene from a mixture comprising para and metadivinylbenzene comprising the steps of
   (A) contacting the mixture, at a temperature not substantially lower than 0° C, in liquid state, with a solid monovalent salt selected from the group consisting of copper and silver to form a solid coordination compound,
   (B) separating said coordination compound so obtained from the mother liquor,
   (C) heating said coordination compound to a temperature above about 75° C. to decompose said coordination compound to recover therefrom a liquid having a paradivinylbenzene to metadivinylbenzene ratio substantially greater than in said original mixture.

4. The method of claim 1 wherein said solid monovalent salt is cuprous chloride.

5. The method of claim 3 wherein said solid monovalent salt is cuprous chloride.

6. The method of claim 3 comprising the additional step of diluting the mixture of para and metadivinylbenzene to be contacted with the solid monovalent salt with an inert liquid.

7. The method of separating paradivinylbenzene from a mixture comprising paradivinylbenzene and metadivinylbenzene comprising
   (A) contacting the mixture, in liquid state, at a temperature no lower than about 0° C., with cuprous chloride to form a solid coordination compound,
   (B) separating said coordination compound so obtained from the liquid phase,
   (C) adding an inert liquid to said coordination compound,
   (D) heating said coordination compound and said inert liquid to in excess of about 75° C. to decompose said coordination compound to cuprous chloride and a liquid having a paradivinylbenzene to metadivinylbenzene ratio substantially larger than in said original mixture,
   (E) separating the cuprous chloride obtained from step (D) from the mixture of the inert liquid and the liquid released by the decomposition of said coordination compound in step (D),
   (F) and distilling the liquid mixture of step (E) to remove the inert liquid of step (C) to obtain a residue that is a paradivinylbenzene product.

8. The method of claim 7 wherein the inert liquid of step (C) has a substantially lower boiling point than paradivinylbenzene.

9. The method of claim 7 wherein said inert liquid of step (C) is toluene.

10. The method of claim 7 wherein the distillation is carried out under a vacuum.

11. The method of claim 7 wherein an alcohol selected from the group consisting of methyl alcohol, ethyl alcohol, and propyl alcohol is added to the mixture and the cuprous chloride of step (A) to catalyze the reaction.

12. A method of separating paradivinylbenzene and metadivinylbenzene from a mixture comprising para and meta divinylbenzene comprising the steps of
   (A) contacting the mixture, in liquid state, with a solid monovalent salt selected from the group consisting of copper and silver to form a coordination compound,
   (B) separating said coordination compound so obtained from the liquid phase and retaining said liquid phase as a meta enriched composition,
   (C) heating said coordination compound to recover a liquid having a paradivinylbenzene to metadivinylbenzene ratio substantially greater than in said original mixture.

13. A method of separating paradivinylbenzene and metadivinylbenzene from a mixture comprising para and metadivinylbenzene comprising the steps of
   (A) contacting the mixture, at a temperature not substantially lower than 0° C., in the liquid state, with a solid monovalent salt of copper to form a solid coordination compound,
   (B) separating said coordination compound so obtained from the mother liquor and retaining said mother liquor as a meta enriched composition,
   (C) heating said coordination compound to a temperature above about 75° C. to decompose said coordination compound to recover therefrom a liquid having a paradivinylbenzene to metadivinylbenzene ratio substantially greater than in said original mixture.

14. The method of claim 12 wherein said solid monovalent salt is cuprous chloride.

15. The method of claim 13 wherein said solid monovalent salt is cuprous chloride.

16. The method of claim 12 in which said mixture further comprises ethylvinylbenzene.

17. The method of claim 16 in which said mixture further comprises diethylbenzene.

18. The method of claim 12 comprising the additional steps of
(D) contacting the retained liquid phase of step (B) with a solid monovalent salt selected from the group consisting of copper and silver to form a coordination compound,
(E) separating said coordination compound of step (D) from the liquid phase,
(F) heating said coordination compound of step (E) to recover a liquid having a metadivinylbenzene to paradivinylbenzene ratio substantially greater than in said original mixture first treated in step (A).

19. The method of claim 13 comprising the additional steps of
(D) contacting the retained liquid phase of step (B) with a solid monovalent salt selected from the group consisting of copper and silver to form a coordination compound,
(E) separating said coordination compound of step (D) from the liquid phase,
(F) heating said coordination compound of step (E) to recover a liquid having a metadivinylbenzene to paradivinylbenzene ratio substantially greater than in said original mixture first treated in step (A).

20. The method of claim 14 comprising the additional steps of
(D) contacting the retained mother liquor of step (B) with cuprous chloride to form a coordination compound,
(E) separating said coordination compound of step (D) from the liquid phase,
(F) heating said coordination compound of step (E) to recover a liquid having a metadivinylbenzene to paradivinylbenzene ratio substantially greater than in said original mixture first treated in step (A).

21. A process for the separation of the para and meta isomers of divinylbenzene from a mixture comprising said para and meta isomers, comprising:
(A) contacting said mixture, in liquid form, with a monovalent salt of copper at a temperature no lower than 0° C. to permit the formation of a coordination compound between a part of said divinylbenzene isomers and said monovalent salt, said coordination compound forming preferentially with the para isomer,
(B) separating said coordination compound from the components of said mixture which did not react to enter into said compound,
(C) heating said coordination compound to decompose it to free the monovalent salt of copper from the isomers of the para and metadivinylbenzene, the resulting para, metadivinylbenzene product being substantially enriched with the para isomer,
(D) contacting the said components which did not react in step (B) with a monovalent salt of copper at a temperature no higher than about 0° C. to form a coordination compound with a part of the meta and para isomers of divinylbenzene from said components,
(E) separating the coordination compound formed in step (D) from its mother liquor, and
(F) heating said coordination compound of step (E) to decompose it and recovering from it a fraction which is substantially meta rich, compared to the product obtained in step (C).

22. The method of claim 3 wherein the temperature of step A is not substantially lower than 10° C.

23. The method of claim 7 wherein the temperature of Step A is no lower than about 10° C.

References Cited by the Examiner
UNITED STATES PATENTS
2,973,394   2/61   Atkinson et al. _____ 260—669

DELBERT E. GANTZ, *Primary Examiner.*

ALPHONSO D. SULLIVAN, *Examiner.*